US009042360B2

(12) United States Patent
Stirbu et al.

(10) Patent No.: US 9,042,360 B2
(45) Date of Patent: May 26, 2015

(54) MODIFYING REMOTE SERVICE DISCOVERY BASED ON PRESENCE

(75) Inventors: Vlad Stirbu, Tampere (FI); Dan Marinescu, Tampere (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 840 days.

(21) Appl. No.: 13/312,100

(22) Filed: Dec. 6, 2011

(65) Prior Publication Data

US 2012/0079128 A1 Mar. 29, 2012
US 2012/0331166 A2 Dec. 27, 2012

Related U.S. Application Data

(63) Continuation of application No. 11/801,300, filed on May 9, 2007, now Pat. No. 8,081,610.

(51) Int. Cl.

| | |
|---|---|
| ***H04W 8/18*** | (2009.01) |
| ***H04L 29/08*** | (2006.01) |
| ***H04W 48/10*** | (2009.01) |
| ***H04W 84/18*** | (2009.01) |

(52) U.S. Cl.

CPC ................ *H04W 8/18* (2013.01); *H04W 48/10* (2013.01); *H04W 84/18* (2013.01); *H04L 67/16* (2013.01); *H04L 67/104* (2013.01); *H04L 67/24* (2013.01); *H04L 67/1068* (2013.01)

(58) Field of Classification Search

CPC ... H04L 67/16; H04L 12/2809; H04L 69/329; H04L 67/14; H04L 12/2803; H04L 12/2805; H04L 67/02; H04L 29/12594; H04L 2012/2849; H04L 67/125; H04L 29/12235; H04L 29/1232; H04L 61/2023; H04L 61/20

USPC .......... 455/414.1, 552.1, 412.1, 432.1, 432.3, 455/433, 503; 379/201.01, 201.02, 201.03, 379/221.15; 709/203, 223, 225, 229, 202, 709/217, 219, 227, 238, 201, 204, 206, 218, 709/220, 228, 230, 249

See application file for complete search history.

(56) References Cited

U.S. PATENT DOCUMENTS

| | | | |
|---|---|---|---|
| 7,466,810 B1 | 12/2008 | Quon et al. | |
| 8,081,610 B2 | 12/2011 | Stirbu et al. | |
| 2005/0078644 A1 | 4/2005 | Tsai et al. | |
| 2005/0138179 A1 | 6/2005 | Encarnacion et al. | |
| 2005/0240758 A1 | 10/2005 | Lord et al. | |
| 2006/0173985 A1 | 8/2006 | Moore | |
| 2007/0162165 A1 | 7/2007 | Stirbu et al. | |
| 2007/0195760 A1 | 8/2007 | Rahman et al. | |
| 2007/0207789 A1 | 9/2007 | Zellner et al. | |
| 2007/0220515 A1 | 9/2007 | Dewitt et al. | |
| 2007/0291761 A1* | 12/2007 | Kauniskangas et al. | 370/395.2 |
| 2008/0028088 A1 | 1/2008 | Walter et al. | |
| 2009/0089379 A1 | 4/2009 | Pegg | |

* cited by examiner

*Primary Examiner* — Inder Mehra

(57) ABSTRACT

Modifying remote service discovery based on presence involves identifying service discovery data using ad-hoc, peer-to-peer, service discovery protocols of a local network. The service discovery data is aggregated via an entity of the local network. Presence data associated with a remote device located outside of the local network is identified and the aggregated service discovery data is altered based on the presence data. The altered aggregated service discovery data is made available to the remote device using out-of-band communications. The out-of-band communications are different from the service discovery protocols of the local network.

21 Claims, 7 Drawing Sheets

MODIFYING REMOTE SERVICE DISCOVERY BASED ON PRESENCE

FIELD OF THE INVENTION

This invention relates in general to remote access of networks, and more particularly to service discovery via remote access.

BACKGROUND OF THE INVENTION

Mobile communications devices such as cell phones increasingly include advanced data processing and communications capabilities. Far from being simple voice communications tools, modem mobile devices may include many different capabilities, such as email, text messaging, Web browsing, digital photography, sound recording/playback, location awareness, etc. As such, these devices are gaining ever-wider acceptance and are become increasingly valuable to end-users.

In order to increase the bandwidth available to mobile device users, mobile network providers and mobile device manufacturers are transitioning to third-generation (3G) technologies. The designation 3G refers to a collection of standards and technologies that can be used in the near future to enhance performance and increase data speed on cell phone networks. In particular, 3G is an International Telecommunication Union (ITU) specification for the third generation of mobile communications technology. A 3G cell phone would, in theory, be compatible with the 3G languages or standards which support enhanced data speeds.

Besides communicating over provider networks, 3G devices may also be used to communicate locally with other consumer electronics devices in a user's home or workplace. For example, a standard known as Universal Plug and Play™. (UPnP) provides a way for disparate processing devices to exchange data via a home network. The UPnP specification includes standards for service discovery, and is mainly targeted for proximity or ad hoc networks. Various contributors publish UPnP device and service descriptions, thus creating a way to easily connect devices and simplifying the implementation of networks. It is the goal of UPnP to enable home electronics to seamlessly interact, thus furthering the usefulness of such devices. Because a 3 G communications device can also process data, it is possible for such devices to communicate via UPnP networks.

Besides allowing locally connected to devices to intercommunicate, the UPnP standard provides a way for the locally devices to seamlessly access external networks such as the Internet using UPnP. Generally, a UPnP Internet Gateway Device (IGD) resides on the edge of the UPnP network and provides connectivity to a Wide Area Network (WAN) and/or the Internet. An IGD may be implemented as a standalone device or included in another UPnP device (e.g., a personal computer). Besides allowing local UPnP devices to access the Internet, the IGD may also be configured to allow the user to access devices on the UPnP network via the Internet when the user is away from the local network. Such access is commonly referred to as "remote access."

When the user is away from the network, remote access will often be established using a mobile device. Generally, a mobile device may be any small computing and communications device such as a cell phone, Personal Digital Assistant, etc., that runs on batteries and communicates wirelessly. These devices can be conveniently carried with users, and advances in mobile computing technologies have allowed mobile device to increasingly include more features, greater storage capacity, and greater processing power. Even so, establishing remote access connections may be expensive for mobile devices. For example such devices may keep the communications subsystem on during the connection, which shortens battery life and therefore degrades the user experience. Further, some access networks that the user may encounter charge based on bandwidth usage, and a user may not want to incur these costs (or at least limit the costs) for remotely monitoring a home network.

Quite often it happens that the user is involved in situations where the remote access connections are not needed. For example, the user might be in a meeting and he doesn't need to interact with his home devices. Such home devices may include a media player where the user stores music for remote playback. In that event, the user might choose to end the remote access connection to save battery lifetime. When the meeting is over he wants to interact with his media player, but the remote access connection is not available and he must activate it before the service is available. Having to manually perform the task of activating and deactivating the remote access connection is not very user friendly and might lead to situations where the user will not use the feature at all. Therefore, a way of seamlessly and automatically affecting remote access to a UPnP network based on a user's present situation is desirable.

SUMMARY OF THE INVENTION

To overcome limitations in the prior art described above, and to overcome other limitations that will become apparent upon reading and understanding the present specification, the present invention discloses a system, apparatus and method for modifying remote service discovery based on presence. In accordance with one embodiment of the invention, a method involves identifying service discovery data using ad-hoc, peer-to-peer, service discovery protocols of a local network. The service discovery data is aggregated via an entity of the local network. Presence data associated with a remote device located outside of the local network is identified, and the aggregated service discovery data is altered based on the presence data. The altered aggregated service discovery data is made available to the remote device using out-of-band communications. The out-of-band communications are different from the service discovery protocols of the local network.

In more particular embodiments, the service discovery protocols of the local network may include the Simple Service Discovery Protocol and the local network may include a Universal Plug and Play network. The out-of-band communications may include Web syndication communications. In one arrangement, identifying the presence data involves subscribing to presence notification via a presence server located outside of the local network. In one arrangement, the method further involves communicating the presence data to one or more peer-to-peer devices via the local network.

In other more particular embodiments, altering the aggregated service discovery data involves limiting the visibility of one or more services of the local network based on a presence state identified via the presence data. The visibility of the one or more services may be limited based on lack of secure access to the one or more services and/or based on limited available network bandwidth of the remote device. In other arrangements, altering the aggregated service discovery data involves limiting the visibility of one or more services based on monetary costs associated with network bandwidth used by the remote device and/or limiting the visibility of one or more services to allow the remote device to conserve power.

In other more particular embodiments, the method further involves associating at least one filter with each of a plurality of known presence states. Each filter describes services that may be remotely advertised to the remote device based on the presence state associated with the filter. In such a case, altering the aggregated service discovery data based on the presence data may involve a) identifying a presence state based on the presence data, (the identified presence state conforms to one of the known presence states); b) selecting the filter associated with the identified presence state; and c) altering the aggregated service discovery data with the selected filter.

In another embodiment of the invention, an apparatus includes one or more network interfaces capable of communicating via a local network and a remote network. A processor is coupled to the one or more network interfaces and memory is coupled to the processor. The memory includes instructions that cause the processor to identify service discovery data of the local network using an ad-hoc, peer-to-peer, service discovery protocol and aggregate the service discovery data. The processor further identifies, via the remote network, presence data associated with a remote device of the remote network, alters the aggregated service discovery data based on the presence data, and makes the altered aggregated service discovery data available to the remote device via the remote network using out-of-band communications. The out-of-band communications are different from the service discovery protocols of the local network.

In more particular embodiments, the service discovery protocol of the local network may include Simple Service Discovery Protocol, and the out-of-band communications may include Web syndication communications. Altering the aggregated service discovery data may involve limiting the visibility of one or more services of the local network based on lack of secure access to the one or more services and/or limiting the visibility of one or more services of the local network based on limited available network bandwidth of the remote device identified via the presence data. Altering the aggregated service discovery data may involve limiting the visibility of one or more services of the local network based on monetary costs associated with network bandwidth used by the remote device and/or limiting the visibility of one or more services of the local network to allow the remote device to conserve power.

In other more particular embodiments, the memory further includes filter data describing a plurality of filters. At least one of the filters is associated with each of a plurality of known presence states, and each of the filters describes services that may be remotely advertised to the remote device based on the presence state associated with the filter in one configuration, the instructions cause the processor to: a) identify a presence state based on the presence data, wherein the identified presence state conforms to one of the known presence states; b) select the filter associated with the identified presence state; and c) alter the aggregated service discovery data with the selected filter. In one arrangement, the instructions further cause the processor to communicate the presence data to one or more peer-to-peer devices via the local network.

In another embodiment of the invention, a computer-readable storage medium has instructions stored which are executable by an apparatus capable of being coupled to a local network and a remote network the instructions are executable for performing steps that include a) identifying service discovery data of the local network using an ad-hoc, peer-to-peer, service discovery protocol; b) aggregating the service discovery data; c) identifying, via the remote network, presence data associated with a remote device of the remote network; d) altering the aggregated service discovery data based on the presence data; and e) making the altered aggregated service discovery data available to the remote device via the remote network using out-of-band communications. The out-of-band communications are different from the service discovery protocols of the local network.

In another embodiment of the invention, a system includes a network that facilitates service discovery using ad-hoc, peer-to-peer, service discovery protocols. The system further includes means for identifying service discovery data of the network using the ad-hoc, peer-to-peer, service discovery protocols and means for aggregating the service discovery data. The system includes means for identifying presence data associated with a remote device located outside of the network and means for altering the aggregated service discovery data based on the presence data. The system further includes means for making the altered aggregated service discovery data available to the remote device using out-of-band communications. The system may further include means for communicating the presence data to one or more peer-to-peer devices via the network.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figure 1:
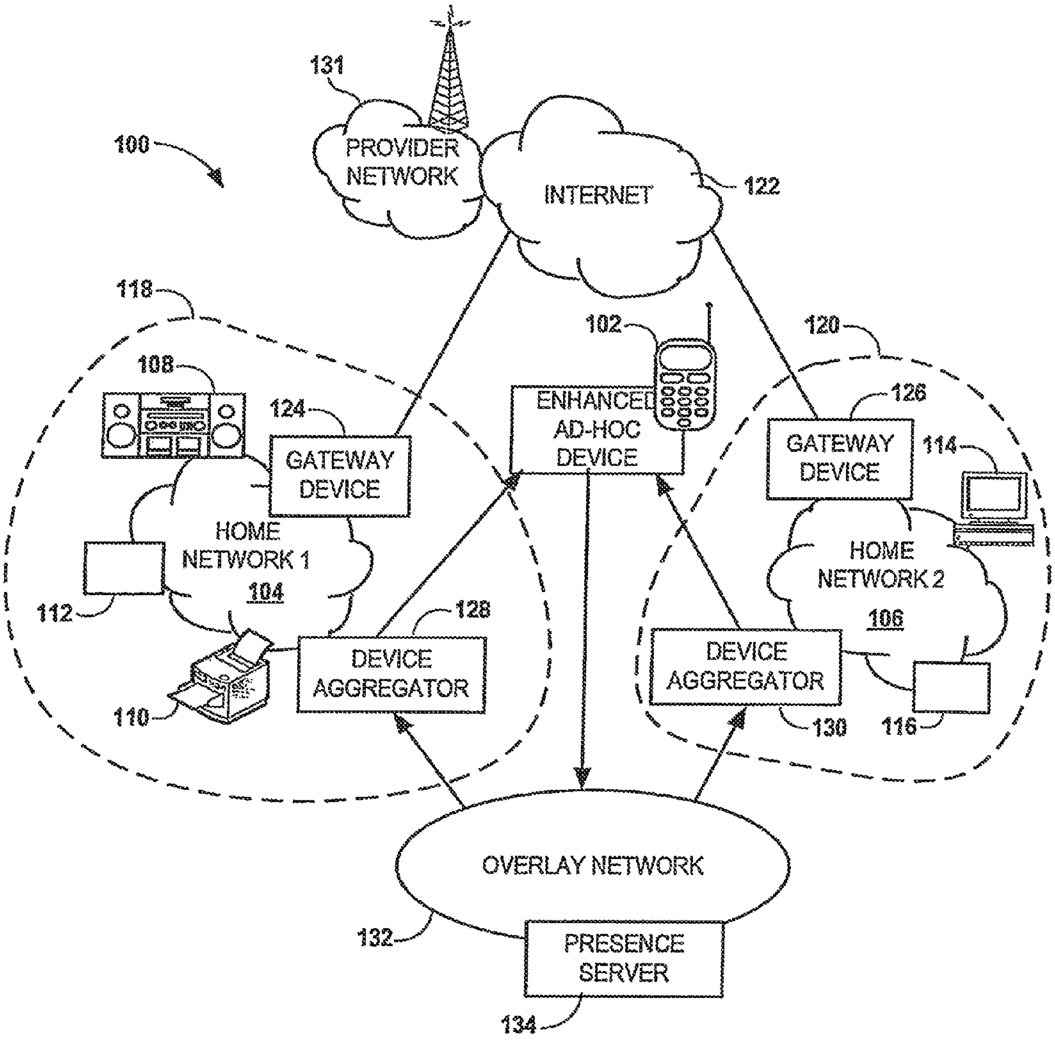
FIG. 1 is a block diagram illustrating a system according to embodiments of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to configuring mobile communications devices for more efficiently accessing local networks. In particular, the local networks include ad-hoc, peer-to-peer networks formed between consumer device inside a home or other geographically limited space. Such networks are considered to be "ad-hoc" because the network may be automatically self-formed by peer nodes that discover each other's existence and capabilities automatically. Each peer may be willing to forward data (and provide other peer-to-peer services) for other peers, and so the determination of which nodes provide a particular service is made dynamically based on the network connectivity. This is in contrast to older network technologies in which some designated nodes, usually with custom infrastructure hardware (e.g., servers, routers, hubs, firewalls, and switches), perform designated tasks or services. Minimal configuration and quick deployment make ad hoc networks suitable for emergency situations like emergencies, where some infrastructure elements may not be relied upon. Such ad-hoc networks are also useful in consumer environments, because they free the consumer from having to understand and configure the function of various infrastructure devices.

An example of ad-hoc, peer-to-peer protocols are those protocols used in the UPnP architecture. UPnP uses the Simple Service Discovery Protocol (SSDP) for service discovery, and is generally built on top of Internet Protocol (IP) based networks. Although concepts of the present invention may be described in terms of UPnP networks, those familiar with the applicable art will appreciate that these concepts may be applied to any manner of ad-hoc, peer-to-peer networking arrangement suitable for consumer or business networks. For example, the Service Location Protocol (SLP), Zeroconf, and Jini™. are protocols that provide functions similar to those of UPnP.

Such networks are designed to interconnect devices within a limited geographical area, such as is typical with a home or office environment (e.g., "islands"). However, adaptations may be made to such networks to allow a remote device outside the local network environment to access devices and services of the local network. Such remote access is typically achieved via public networks such as the Internet, and as such the access mechanisms usually involve a number of security precautions to prevent unauthorized access. Remote access is also often carried out via mobile devices, and so the limited battery capacity and bandwidth capacity of such devices must be taken into account when implementing the access mechanisms. Depending on the provider of the mobile network services, there may also be monetary costs incurred with network access, such as fees based on number of bytes transferred to/from the Internet.

The present disclosure describes an architecture where connectivity between ad-hoc, peer-to-peer, local networks/islands is automatically altered based on rules which are determined based on the presence information available via mobile service provider networks. Such connectivity decisions may be made, for example, to preserve battery power or limit network bandwidth usage when it is known that such remote access is unnecessary. Another application is where the user wants to restrict the visibility of some or all of the devices on the local network based on where the user is and what kind of remote device is being used and the network access technology the remote device is using. The mechanisms that alter the remote access connectivity should require as little user interaction as possible so that the appeal of the remote access feature is not lost.

In reference now to FIG. 1, a block diagram 100 illustrates a network architecture that enables an enhanced device 102 to selectively connect and disconnect from various localized networks, such as exemplified by networks 104, 106. The local networks 104, 106 may include any combination of data transmission media and protocols. For example, the networks 104, 106 may utilize wired or wireless data transmission media. Similarly, devices on the local networks 104, 106 may various physical and data link layer protocols to intercommunicate, including, Ethernet, FDDI, PPP, ATM, HDLC, Fibre Channel, X-10, serial/parallel point-to-point connections, etc. A number of higher layer network protocols may operate on the networks 104, 106 as well, including TCP/IP, UDP/IP, IPX, Appletalk, ICMP, ARP, SNMP, DNS, FTP, NetBEUI.

Generally, the local networks 104, 106 may support one or more protocols for ad-hoc, peer-to-peer service discovery and interoperability. One example of this type of discovery protocol is the Simple Service Discovery Protocol (SSDP) used in the UPnP architecture. SSDP is generally built on top of Internet Protocol (IP) based networks, and uses User Datagram Protocol (UDP) multicasts of eXtensible Markup Language (XML) formatted service descriptions. Although concepts of the present invention may be described in terms of UPnP networks, those familiar with the applicable art will appreciate that these concepts may be applied to any manner of ad-hoc, peer-to-peer networking arrangement suitable for consumer oriented networks. For example, the present invention may also be any combination of home networking and control technologies such as Jini, Bluetooth, X-10, xAP, Rendezvous, HomeRF, IrDA, etc.

In the future, more and more consumer devices will include processing capability, and therefore can benefit from being locally networked. In the illustrated diagram 100, the local network 104 couples an entertainment system 108 and printer 110, and these may attach to each other and to any other compatible device, as represented by generic peer device 112. The other local network 106 includes computer 114 and generic peer device 116. These devices 108, 110, 112, 114, and 116 are merely exemplary; any manner of electronic or electro-mechanical device may be made network-aware and interoperate via the local networks 104, 106. Protocols such as UPnP are designed to be generic and flexible so that any type of control or data processing functionality can be abstracted and offered as a service to any other UPnP capable entity on the networks 104, 106.

The local networks 104 are typically designed to service a limited physical region, as indicated by the physical regions 118, 120. These regions 118, 120 may include any space where a user would like devices to easily interoperate, including a home, office, hotel room, automobile, airplane, boat, public wireless hotspot, etc. The protocols used in the local networks 104, 106 (e.g., UPnP) often assume that the networks 104, 106 will need to support only a limited number of devices operating within a reasonably small area. However, many devices on the local network 104 may benefit from information services available via an external network, such as the Internet 122.

To provide access to the Internet 122, one or more devices of the networks may be designated as a gateway device 124, 126. The gateway device 124, 126 may be designated as a default route for any traffic that is not routable on the local networks 104, 106. This traffic may include content such as Web pages, email, and use protocols/provide services such as Domain Name Services (DNS), Windows Internet Naming Service (WINS), and Dynamic Host Configuration Protocol (DHCP). Generally, these types of content and services are utilized by clients operating on the local networks 104, 106 for accessing a service on the external networks 122. The gateway device 124, 126, particularly a UPnP IGD, is typically capable of being easily configured either automatically or by the user to provide this type of access to the external network 122.

Although there are many advantages of interconnecting devices on the local networks 104, 106 it may be even more useful if the services and devices on the networks 104, 106 can be utilized from outside the environments 118, 120 particularly via globally accessible external networks that make up the Internet 122. This form of access will be referred to herein as "remote access." Generally remote access involves allowing devices on an external network 122 to access services and devices of a protected, local network 104, 106. Remote access entry points of the local networks 104, 106 would typically include the gateway devices 124, 126, and such gateway devices 124 may perform authentication to prevent unauthorized access. The gateway devices 124, 126 may also provide other features to help protect the local networks 104, 106, such as encryption of any remote access data.

The local ad-hoc networks 104, 106 may be considered "islands," because most of the traffic related to the ad-hoc, peer-to-peer functionality is intended to remain on the individual network. For example, service discovery messages such as SSDP announcements may rely on multicasting, and generally Internet Service Providers (ISP) do not pass multicast traffic on their routers. Therefore, even in the IDGs 124, 126 were configured to pass such traffic to external routers, the Internet Service Providers that maintain those external routers would likely block the multicast data. Therefore, in order to allow the multicast and other localized data traffic to be passed to a remote device the IDGs 124, 126 and/or other device may alternate mechanisms to "simulate" such traffic to the remote device 102. These alternate mechanisms may also be used to send data from the remote device 102 to the local networks 104, 106.

An important feature that allows ad-hoc networks to form is the broadcasting/multicasting of service data to all interested listeners. However, it may be difficult or undesirable to send all of that type of data traffic to the remote device 102. For example, the remote access connection used by the device 102 may not pass such traffic in its original form. In other cases, the volume of such traffic may overwhelm a limited-bandwidth network connection of the remote device 102. In order to facilitate service discovery for remote access connections, each of the illustrated local networks 104, 106 includes a device aggregator 128, 130. The aggregators 128, 130 monitor the data traffic in the local networks 104, 106 and aggregate information about devices and services available in the network. This aggregated data is then sent to the remote devices 102, typically using an out-of-band mechanism that is different from the service discovery mechanisms of the local networks 104, 106. For example, such data as service announcements, device power states, and other service and state data can be collected and condensed at the aggregators 128, 130. The aggregators 128, 130 then communicate this data via an out-of-band connection to the remote device 102.

The remote device 102 may connect to the networks 104, 106, via a direct Internet connection (e.g., through a TCP/IP network) or via a particular mobile service provider network 131 that provides some level of Internet access to mobile devices. For example, the service provider network 131 may use a protocol such as Wireless Application Protocol (WAP) that provides Internet-type services, but in a more compact form and using protocols that are better suited to mobile environments. By using either direct or indirect access to the Internet 122 (or other wide area network) the mobile device 102 can use the appropriate mechanisms to locate and connect to the IDGs 124, 126 (or other network edge device), and thereafter utilize the services of the device aggregators 128, 130. A detailed description of the functionality of one type of a device aggregator suitable for UPnP (and similar) networks can be found in commonly assigned U.S. patent application filed Dec. 1, 2006, having Ser. No. 11/566,132 and entitled "System And Method For Using An Out-Of-Band UPnP Service Discovery System," which is hereby incorporated by reference in its entirety.

The remote access device 102 that is capable of accessing the local networks may also be connected to an overlay network 132. Generally, an overlay network 132 may be considered a computer network which is built on top of one or more other networks. Individual entities (e.g., nodes) of the overlay network 132 may be connected by virtual or logical links that are distinct from (although might make use of) physical links in the underlying network. In the illustrated environment, the overlay network 132 facilitates point-to-point, real time or near-real-time digital communications, as exemplified by voice over IP (VoIP) and IP Multimedia Subsystem (IMS). The overlay network 132 may be run by a commercial entity, examples of which include Skype™, Yahoo®. Messenger, 3rd Generation Partnership Project (3GPP™), IMS, etc.

As part of or in addition to the point-to-point communication services, the overlay network 132 provides presence services by way of one or more presence servers 134. Presence services are used to determine the location, willingness to communicate, and other parameters relating to whether a user can engage in real-time or near real-time communications. Presence technology generally refers to applications and services that facilitate location and identification of one or more endpoints to such communication links. For example, if a user of a wireless, handheld device would like to initiate an Internet Multimedia (IM) session with another IM user, presence services may be used to present users' willingness to receive IM messages. Presence services are an integral part of third generation (3G) wireless networks, and are intended to be employed across a wide variety of communication devices.

Typical presence service technology includes the concepts of presentities, presence servers, and watchers. Generally, a presentity can provide information as to its "presence" (e.g., location, willingness to communicate at a certain time or with certain users, etc.). This information can be collected and utilized by presence servers (e.g., server 134), that can notify authorized "watchers" who are interested in presence information that certain presence information is available. Watcher applications may be implemented in wireline and wireless terminals to obtain presence information from the presence servers about other users. This may come in the form of a notification, issued to the watcher by the presence server.

In the illustrated environment 100, the enhanced remote device 102 is capable of publishing its presence information via the presence server 134 of the overlay network 132. Other devices, including the device aggregators 128, 130 of local networks 104, 106, can subscribe to this presence information (e.g., become presence "watchers"), and both the enhanced remote device 102 and local aggregators 128, 130 can alter remote access behavior based on the presence data. This altered access may include limiting connectivity to conserve battery power, or to limiting/modifying access for purposes such as increasing security, complying with company information technology policies, reducing per-byte bandwidth costs, ensuring network compatibility based on such factors as quality of service, etc.

Figure 2:
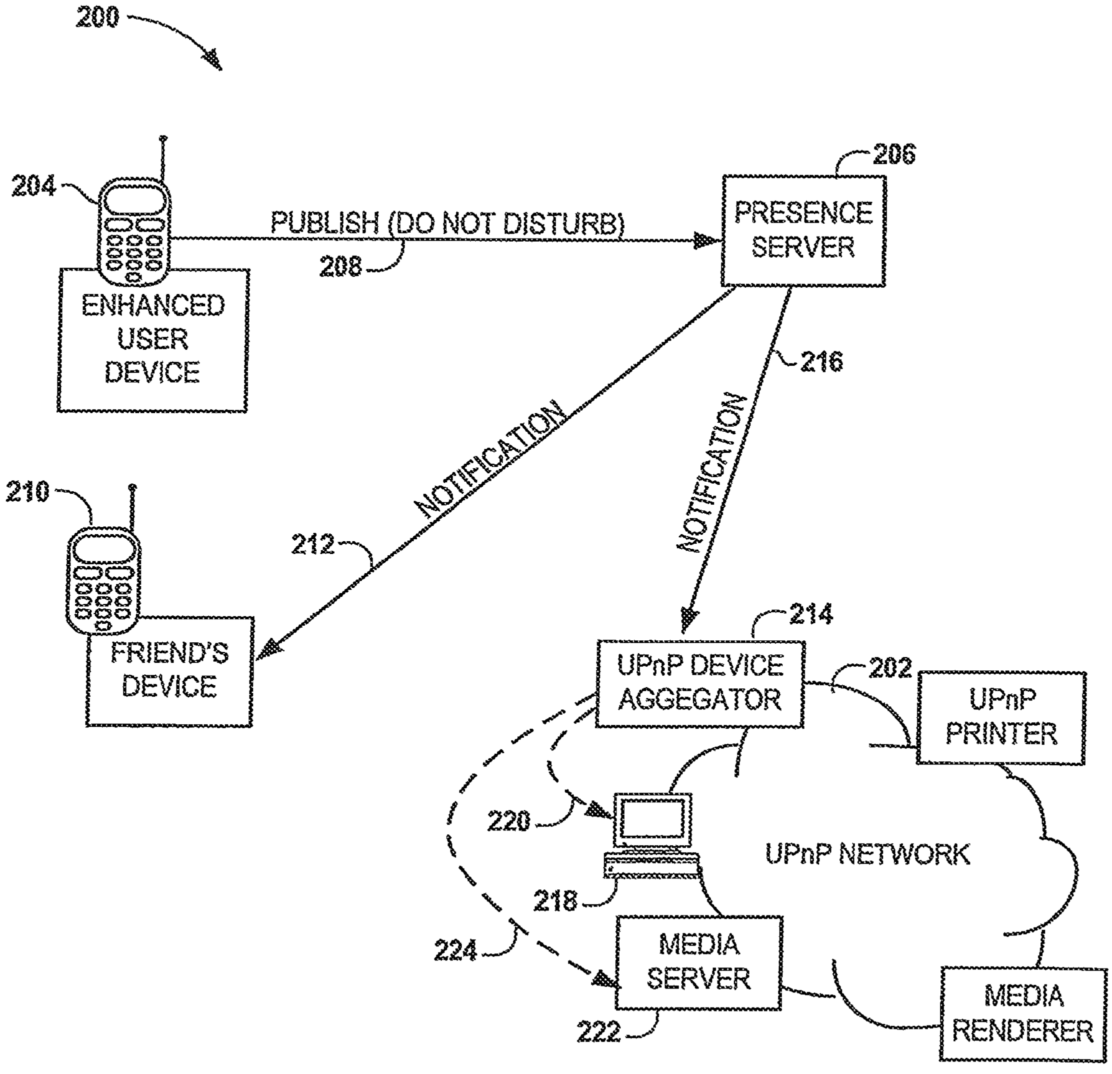
FIG. 2 is a block diagram illustrating update of a UPnP device aggregator based on presence according to an embodiment of the invention.

In reference now to FIG. 2, a block diagram 200 illustrates an example implementation of presence-aware connectivity to a localized ad-hoc peer-to-peer network, and in particular to a UPnP network 202. A remotely located, UPnP capable device 204 is presently external to the UPnP network 202 and receives service discovery data from the network 202 via a UPnP device aggregator 214. The remote device 204 and device aggregator 214 may utilize an out-of-band data transfer mechanism in order allow the device 204 to discover services of the UPnP network 202. In particular, the service discovery may be facilitated by using Web syndication technologies such as Really Simple Syndication (RSS) or Atom. These Web syndication technologies provide an alternative to the native service discovery protocols of the network 202, such as SSDP. Generally, the device aggregator 214 collects local SSDP service announcements and other data, aggregates the data, and sends the data to the remote device 204 using Web Syndication or other out-of-band mechanisms.

The mobile UPnP device 202 is also capable of engaging in data sessions such as voice and IMS via provider networks and/or the Internet. To facilitate these communications, the device 202 may be coupled to a presence server 206 that is accessible from an overlay network (see, for example, overlay network 132 in FIG. 1). The overlay network may be accessed via the Internet or via other wide area networking system. The device 204 generally informs the presence server 206 of its current presence state by way of a signaling message appropriate to the overlay network. In this example, it is assumed that the overlay network utilizes the Session Initiation Protocol (SIP) to establish point-to-point media sessions, and the presence state is communicated by way of a SIP PUBLISH message 208.

As described in greater detail in the appropriate Internet Engineering Task Force (IETF) publications, the SIP PUBLISH message 208 allows, among other things, publication of presence state from a presence user agent 204 to a presence server 206. The presence server 206 composites and tracks presence states of presence user agents, and informs other network entities who have subscribed to notifications of a user agent's presence state. In particular, clients that wish to receive those notifications may use the SIP SUBSCRIBE method to receive those notifications. A typical scenario is shown in FIG. 2, where a friend of the user has a device 210 that has subscribed receive updates 208 of presence state communicated by the user's device 204 to the presence server 206. In response, the friend's device 210 is notified 212 of this change in presence state, and the device 210 can indicate this change to the friend. For example, a client program running on the device 210 can change an icon associated with the user to indicate the change in the user's presence state.

It will be appreciated that any device can subscribe to presence data, often with the requirement that the user who originates the data has already allowed the data be known to the particular device or entity. In the illustrated system 200, a UPnP device aggregator 214 of the UPnP network 202 has subscribed to the user's presence state, and is subsequently notified 216 of the change in presence state communicated by way of the PUBLISH 208. The device aggregator 214 can thereby take appropriate action on the UPnP network 202 in response to the notification 216. In particular, the device aggregator 214 can modify the service discovery messages that the aggregator 214 provides to the device 204 via the out-of-band service discovery mechanisms. As will be explained in greater detail below in relation to FIG. 3, the device aggregator 214 may stop providing the service discovery messages completely, or may limit the messages delivered via the out-of-band mechanisms.

Another way that the device aggregator 214 may make use of the presence updates 216 is to communicate 220, 224 this data to the local network 202 where other UPnP devices can use the presence data. For example, a program running on the user's home computer 218 may receive certain communications and forward such communications to the user device 204 when the device 204 is remotely situated. These communications may originate from the local network 202, such as from home automation monitoring equipment that generates status and alerts, some of which are then sent to the device 204. The user may only wish the messages be sent out during particular presence states. As such, the computer 218 may restrict the sending of status and alerts to the device 204 based on receiving a presence notification 220 from the device aggregator 220.

In some configurations, the device aggregator 214 may also aggregate in-band and/or out-of-band service announcements originating from the device 204 and/or intermediaries such as the presence server 206. In such a configuration, the device aggregator may communicate 220, 224 the aggregated incoming service announcements of device 204 to other devices 218, 222. These aggregated incoming service announcements may include advertisement of device 204 presence state changes 216 received at the aggregator 214. In another arrangement, the remote device 204 itself may communicate the presence state changes to the network 202 contemporaneously with the state change being published 208 to the presence server.

Figure 3:
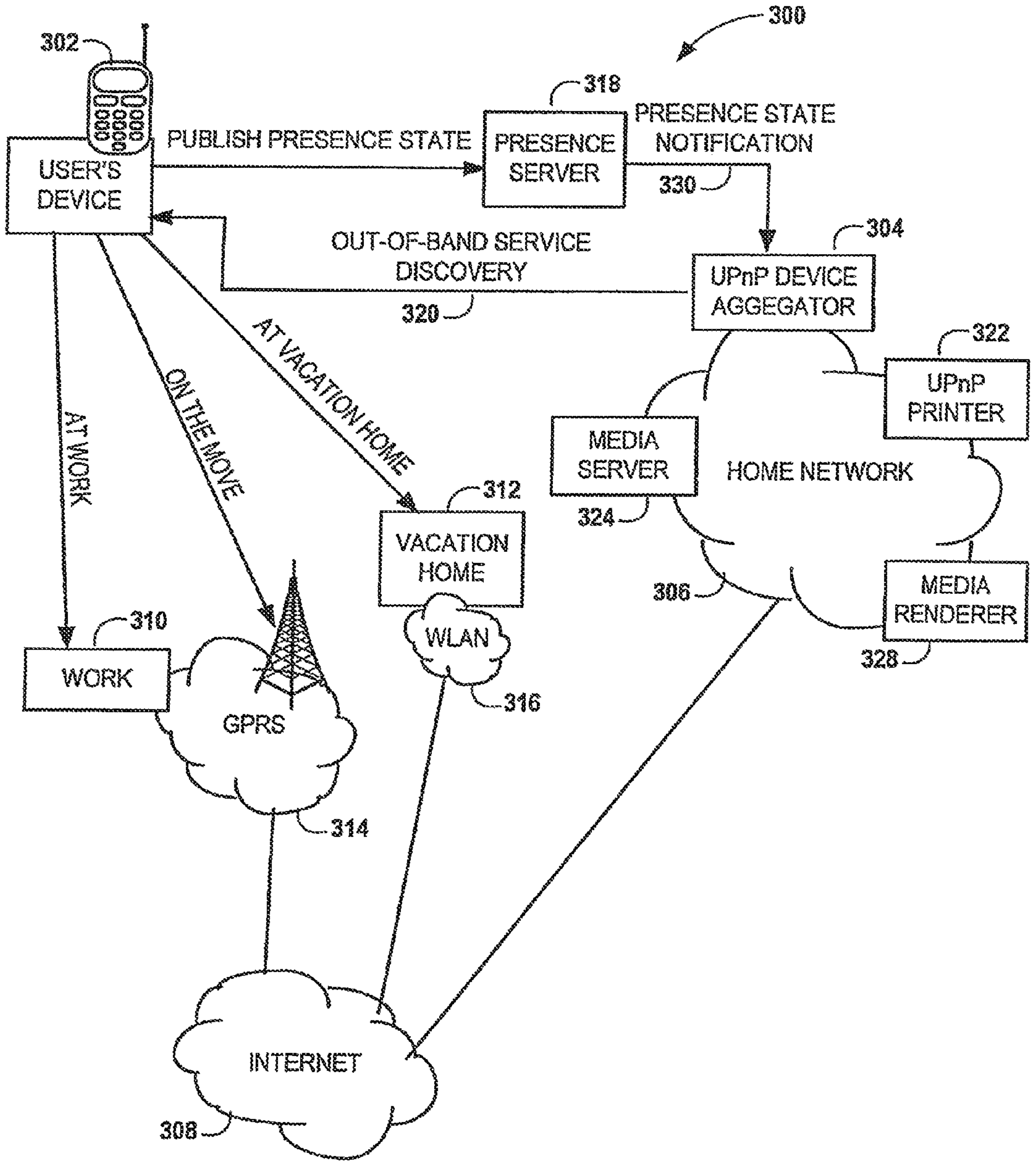
FIG. 3 is a block diagram illustrating modification of out-of-band service discovery based on presence according to an embodiment of the invention.

In reference now to FIG. 3, a block diagram 300 illustrates an enhanced UPnP device 302 and UPnP device aggregator 304 that utilize presence data when managing connections to a localized ad-hoc peer to peer network. The enhanced UPnP device 302 can be remotely connected to a home UPnP network home network 306 via the Internet 308. Internet access may be facilitated by multiple access networks depending on the location of the device 302. For example, the mobile device 302 can use a mobile data service such as a General Packet Radio Service (GPRS) network 314 when at work 310 or when on the move. When at an alternate location, such as vacation home 312, a wireless TCP/IP connection to the Internet 308 may be provided by the use of an 802.11 Wireless Local Area Network (WLAN) 316.

The enhanced device 302 may access a presence server 318 via Internet 308 in order to determine and/or set its presence state. Aspects of the presence state may be both automatically and manually determined For example, the particular access network is being used by the device 302 at any given time can give some clues as the presence state of the device 302. For example, the presence state may be assumed as "at work" or "on the move" whenever data access is exclusively being provided by the GPRS network 314. Further, if data usage fees are associated with the GPRS network 314, then the use of the network 314 may be a relevant part of the presence state, such as a state where only low bandwidth communications are desired. Other presence states, such as "busy" can be explicitly set by the user when the user does not wish to be disturbed. This presence state data is typically published to the presence server 318 so that other people or devices can determine whether or not the user can be contacted and/or wishes to be contacted. Other presence states may be related to the remote device 302 itself, such power usage states. In some cases, it may be desirable to limit the amount of non-critical discovery messages sent to the device when the device is capable of entering a low power or sleep state. Limitation of service discovery messages in such a power state may to enable the device to enter a power conservation state or maintain a power conservation state based on lack of activity.

The presence data can be used by devices of the UPnP home network 306, in particular the UPnP device aggregator 304. The UPnP device aggregator 304 may subscribe to the presence data via the presence server 318. The presence data may be used by the aggregator 304 for altering various aspects of out-of-band service discovery 320 provided to the remote device 302 by the aggregator 304. In some situation, the user may want to restrict the visibility of particular home devices for remote access based on the user's location and/or the nature of the access technology. For example, the user may desire that a UPnP printer 322 should be available only when the user is at the vacation home 312 and on the move. Similarly, a home based media server 324 that has a scheduled recording function should make that function available to the device 302 where ever it is. However, a content directory service of the media server 324 should be made available only at the vacation home 312 (or at the home network 306) due to high transfer costs over GPRS 314. A media renderer 328 of the home network should be available for home use only.

The UPnP device aggregator 304 is the entity that exposes the home devices to the remote device 302 by way of out-of-band service discovery 320. As such, the aggregator 304 may maintain rules or filters that indicate which devices should be made available based on presence states. An example of such a list of rules or filters is shown below in Table 1.

TABLE 1

```
<presence-filter>
    <home>unrestricted</home>
    <work>media server scheduled recording</work>
    <on-the-move>media server scheduled recording,
        printer
    </on-the-move>
    <vacation-home>media server content directory,
        media server scheduled recording,
        printer
    </vacation-home >
</presence-filter>
```

Based on notifications 330 received from the presence server 318, the UPnP device aggregator 304 dynamically updates the list of UPnP devices available for remote access by the device 302. This gives the user the ability to customize the behavior of his UPnP devices in order to automatically adapt to the environment and the constraints in which the user operates. This provides improved usability of the system because the user needs to configure the behavior once and then the system works without user intervention.

It will be appreciated that the user may wish to alter remote access of UPnP services in various different ways besides shutting the services on or off. For example, the user device 302 may be able to render media from the media server 324, both remotely and when directly coupled to the home network 306. However, in locations where network bandwidth is low, any media requested by the device 302 may need to be encoded at low data rates to ensure proper playback. Therefore, the media server 324 (or a proxy device capable of transcoding media received from the media server 324) may offer both a low and high bandwidth media service. In such an arrangement, the aggregator 304 exposes the appropriate service to the device 302 depending on the presence state. Alternatively, function calls or device capabilities negotiations for accessing the media server 324 may be altered by the aggregator 304 or some other intermediary to ensure that the proper bandwidth media is chosen based on the presence state.

In other scenarios, the user may not want sensitive data to be made available on untrusted networks. One way of handling this is for the device aggregator 304 to ensure such services are made unavailable when the device 302 is on an untrusted network, as determined based on presence state. In another arrangement, the sensitive service may have encrypted and unencrypted versions of the service, and only the encrypted service is made available based on the presence data. This modification of presence is particularly useful when the presence data indicates data access parameters relevant to the type of network access currently being used (e.g., maximum data rate, quality of service, usage charges, etc.).

Figure 4:
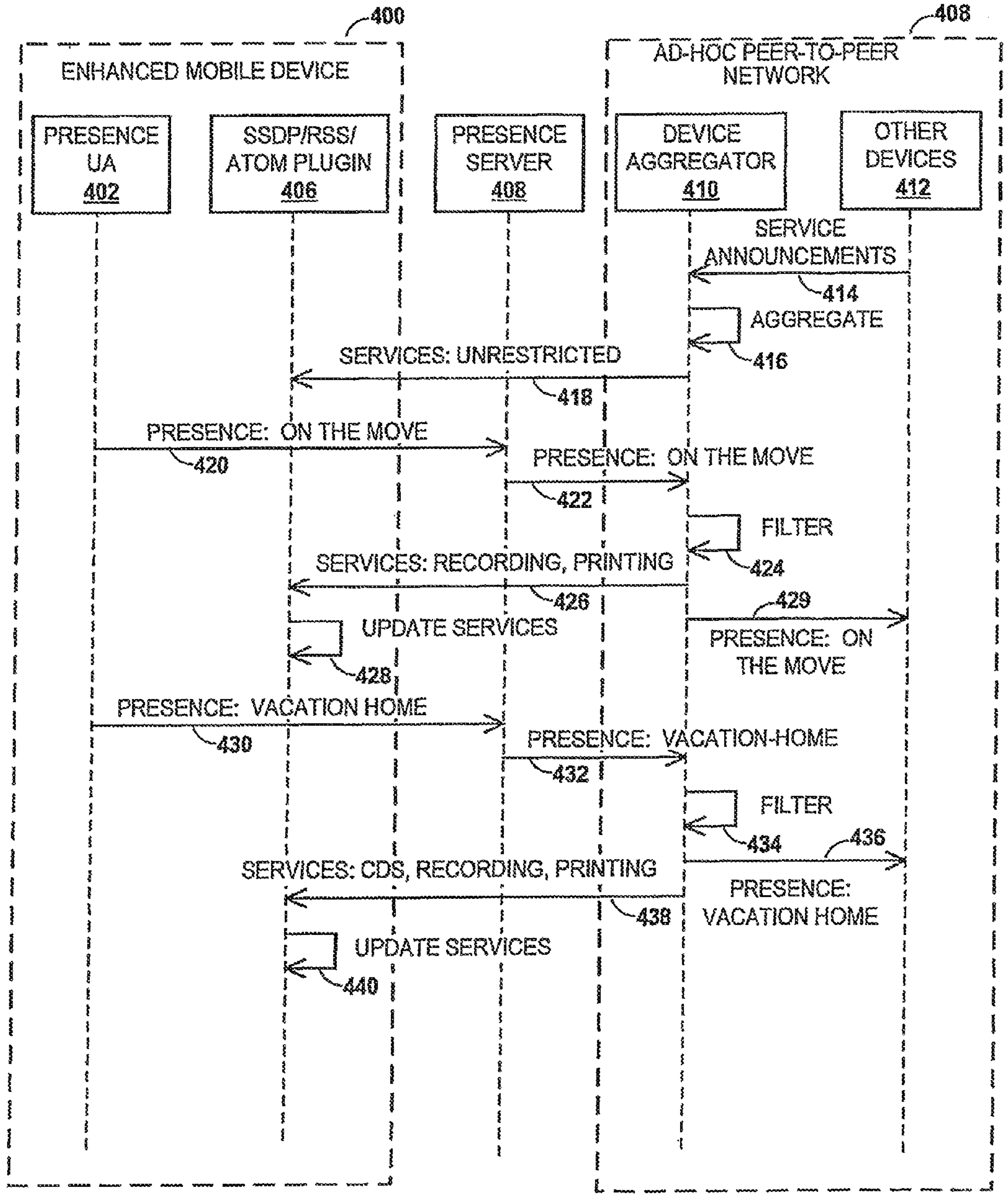
FIG. 4 is a sequence diagram illustrating modification of out-of-band service discovery based on presence according to an embodiment of the invention.

In reference now to FIG. 4, a sequence diagram illustrates a procedure for modifying out-of-band service discovery based on presence according to an embodiment of the invention. Generally, a mobile device 400 includes a presence user agent (UA) 402 and an enhanced, remote-access service discovery plug-in 406. In this example, the enhanced service discovery plug-in 406 receives service messages via a Web syndication mechanism such as RSS or Atom. The service discovery messages may have originally been sent on an ad-hoc, peer-to-peer network 408 using a different service discovery protocol such as SSDP. A device aggregator of the network 410 receives the service discovery messages from other devices 412 of the network 408. The device aggregator 410 aggregates, condenses, reformats, and/or otherwise processes the service discovery data of the network 408 and communicates the changed discovery data to the service discovery plug-in 406 of the mobile device 400.

The presence UA 402 of the mobile device 400 communicates device presence to a presence server 408. The presence server 408 generally tracks user presence based on device signaling messages of the devices with which the user interacts. The presence server 408 may aggregate, correlate, and otherwise process inputs in order to determine a presence state associated with the user at a given time. This presence state is communicated to other network entities that are interested and capable of receiving updates to the user's presences. In the illustrated diagram, the device aggregator 410 is adapted to receive presence data from the presence server 408. The device aggregator 410 is also coupled to other devices 412 of the network 408 for performing ad-hoc, peer-to-peer interactions as known in the art.

The device aggregator 410, like any peer device on the network 408, is capable of receiving service announcements 414. In this diagram, the service announcement 414 is shown occurring once. Typically, the service announcements 414 are continuously repeated, and devices such as the aggregator 410 track timeouts for various known services. When a service announcement 414 fails to repeat for a predetermined amount of time, the aggregator 410 may assume the service is no longer available. The network 408 may also support explicit indications that a service is no longer available. As the device aggregator 410 continually receives service announcements 414, it aggregates 416 data for purposes of presenting a single view of network services to the plug-in 406 of the mobile device 400 using an out-of-band mechanism.

In the illustrated example, the device aggregator 410 may be assumed to filter out-of-band service announcements based on indications of user presence based on the example rules list shown in Table 1. Further, this diagram assumes that, before and during the aggregation step 416, the user's presence is "at home." Therefore, in accordance with the filter shown in Table 1, the device aggregator sends a service announcement 418 to the enhanced plug-in 406 indicating that all services are available (e.g., aggregator is not filtering any services detected via service announcements 414).

At some later time, the user leaves home, and this is detected by the presence UA 402. Accordingly, the presence UA 402 informs the presence server 408 of the change in presence by way of signaling message 420. This signaling message 420 may include a SIP PUBLISH, or other presence signaling message known in the art. In response, the presence server 408 signals the change in presence to the device aggregator 410 by way of message 422. In response to detecting the change in presence, the device aggregator updates its service discovery 424 based on the filters and the new presence state, and sends out a revised service announcement 426 based on the current filter. Based on the list in Table 1, the only services that should be active in the "on the move" presence state are media server scheduled recording and printing, and these are the only services listed in the out-of-band announcement 426. The plug-in 406 (or other component of the enhanced service discovery stack of device 400) will update 428 its internal list of available services based on this announcement 426. In an alternate arrangement, the out-of-band announcement 426 may include data that explicitly indicates certain services are no longer available, and plug-in 406 may assume that other services are still available according to the conventions of the network 408 (e.g., services not yet timed out).

It should be noted that other devices 412 of the network 408 besides the device aggregator 410 may be interested in the presence state of the user. For example, some devices 412 may be able to enter a power saving standby state from which it takes a significant amount of time to awake from. As such the devices 412 may not want to enter this standby state when the user is home in order to maximize system responsiveness. However, a long wakeup time may be perfectly acceptable for remote access, either because of the inherent latencies in remote access or because it is known the services of such devices 412 will not be accessed remotely. Although these devices 412 may also subscribe to the presence server 408 to receive presence updates, it may be more practical to incorporate the presence logic in a single device, and use the in-band protocols of the network 408 to make the user's presence known. As such, in response to receiving the notification 422 of a change in presence state, the device aggregator 410 also sends an in-band notification 429 of presence change to other devices 412.

After some time, the user may arrive at the vacation home, and therefore the presence UA 402 again signals 430 a change in presence state. The presence server 408 notifies 432 the device aggregator 432, which uses the appropriate filter 434 and notifies 436 the other devices 412 of the change in presence. An update service announcement 438 is sent to the enhanced service discovery plug-in 406, and the services available to the device 400 are updated 440 appropriately.

Many types of apparatuses may be able participate in presence-aware tailoring of remote access to home networks as described herein. Mobile devices are particularly useful in this role. In reference now to FIG. 5, an example is illustrated of a representative mobile computing arrangement 500 capable of carrying out operations in accordance with embodiments of the invention. Those skilled in the art will appreciate that the exemplary mobile computing arrangement 500 is merely representative of general functions that may be associated with such mobile devices, and also that landline computing systems similarly include computing circuitry to perform such operations.

The processing unit 502 controls the basic functions of the arrangement 500. Those functions associated may be included as instructions stored in a program storage/memory 504. In one embodiment of the invention, the program modules associated with the storage/memory 504 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 500 via data signals, such as being downloaded electronically via one or more networks, such as the Internet and an intermediate wireless network(s).

The mobile computing arrangement 500 includes hardware and software components coupled to the processing/control unit 502 for performing network data exchanges. The mobile computing arrangement 500 may include multiple network interfaces for maintaining any combination of wired or wireless data connections. In particular, the illustrated mobile computing arrangement 500 includes wireless data transmission circuitry for performing network data exchanges.

This wireless circuitry includes a digital signal processor (DSP) 506 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 508, generally coupled to an antenna 510, transmits the outgoing radio signals 512 and receives the incoming radio signals 514 associated with the wireless device.

The incoming and outgoing radio signals 512, 514 are used to communicate with a mobile service provider network 516. The network 516 may include any voice and data communications infrastructure known in the art, including CDMA, W-CDMA, GSM, EDGE, etc. The network 516 typically provides access to traditional landline data infrastructures, including IP networks such as the Internet. The mobile computing arrangement 500 also includes an alternate network/data interface 518 capable of accessing a local network 520. The alternate data interface 518 may incorporate combinations of I/O and network standards such as USB, Bluetooth, Ethernet, 802.11 Wi-Fi, IRDA, etc. The local network 520 may include any manner of data transfer technology. In some embodiments discussed herein, the network 520 is capable of supporting ad-hoc, peer-to-peer data exchanges, exemplified by UPnP.

The processor 502 is also coupled to user-interface elements 522 associated with the mobile terminal. The user-interface 522 of the mobile terminal may include, for example, a display 524 such as a liquid crystal display. Other user-interface mechanisms may be included in the interface 522, such as keypads 526, speakers, microphones, voice commands, switches, touch pad/screen, graphical user interface using a pointing device, trackball, joystick, etc. These and other user-interface components are coupled to the processor 502 as is known in the art.

The program storage/memory 504 typically includes operating systems and programs for carrying out functions and applications associated with functions on the mobile computing arrangement 500. The program storage 504 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 504 of the mobile computing arrangement 500 may also include software modules for performing functions according to embodiments of the present invention.

In particular, the program storage/memory 504 may include applications 528 capable of interacting with devices and services 529 on the local network 520. These interactions may be enabled when the arrangement 500 is able to directly access the local network 520 (e.g., via data interface 518) or remotely access the network 520 via a wide area network/inter-network 516. For example, an IGD device 530 may be visible on both the local network 520 and the remote network 516. The arrangement 500 is capable of accessing the IGD 530 via the remote network 516 and (typically after authentication) the IGD 530 allows the arrangement 500 to access the local network 520.

The applications 528 may use one or more protocol stacks 532 to access devices and services 529 of the local network 520. The stacks 532 may be implemented as any combination of a shared stack utilized by two or more applications 528, or individual stacks that are separately incorporated into each of the applications 528. The stack(s) 532 also include a plug-in 534 (or other adaptation) that allows the applications 528 to receive service announcements of the local network 520 via out-of-band mechanisms. These out-of-band service announcements are prepared by one or more devices of the network 520 (e.g., device aggregator 536) and communicated to the plug-in 534. The arrangement 500 may only use the out-of-bound service announcements when it is remotely accessing the local network 520, and use native service announcement mechanisms when directly accessing the network 520. In other cases, the arrangement 500 may continue to use the out-of-band mechanisms even when directly coupled to the local network 520.

In some situations, the apparatus 500 may be able to use in-band and out-of-band service discovery at the same time. For example, in previous examples (e.g., see FIG. 3) a user remotely accesses a home network from a vacation home, and service discovery on the home network is accomplished using out-of-band mechanisms. The user may also have a second ad-hoc, peer-to-peer network at the vacation home, and the arrangement 500 may use native service discovery on the second network while at the same using the out-of-band service discovery on home network. Similarly, when the user returns home, the arrangement 500 may be able to remotely access the second network at the vacation home using out-of-band mechanisms, while engaging in native, in-band service discovery on the home network.

The arrangement 500 also includes a presence user agent 538 that interacts with a presence server 540 that is accessible via wide area network 516. The presence user agent 538 may be implemented as part of a single application (e.g., voice or IM client), as a standalone program, or as a operating system utility or service of the arrangement 504. The presence user agent 538 determines presence states that describe the ability and willingness of a user to engage in communications, and makes this presence state data known to the presence server 540. In turn, the presence server 540 manages this data and sends presence updates to interested devices. In the illustrated context, the device aggregator 536 is one such device that is interested in receiving presence state associated with the arrangement 500 and/or the user of the arrangement 500. The device aggregator 536 may modify the service announcements sent to the plug-in 534 in response to presence state.

Figure 5:
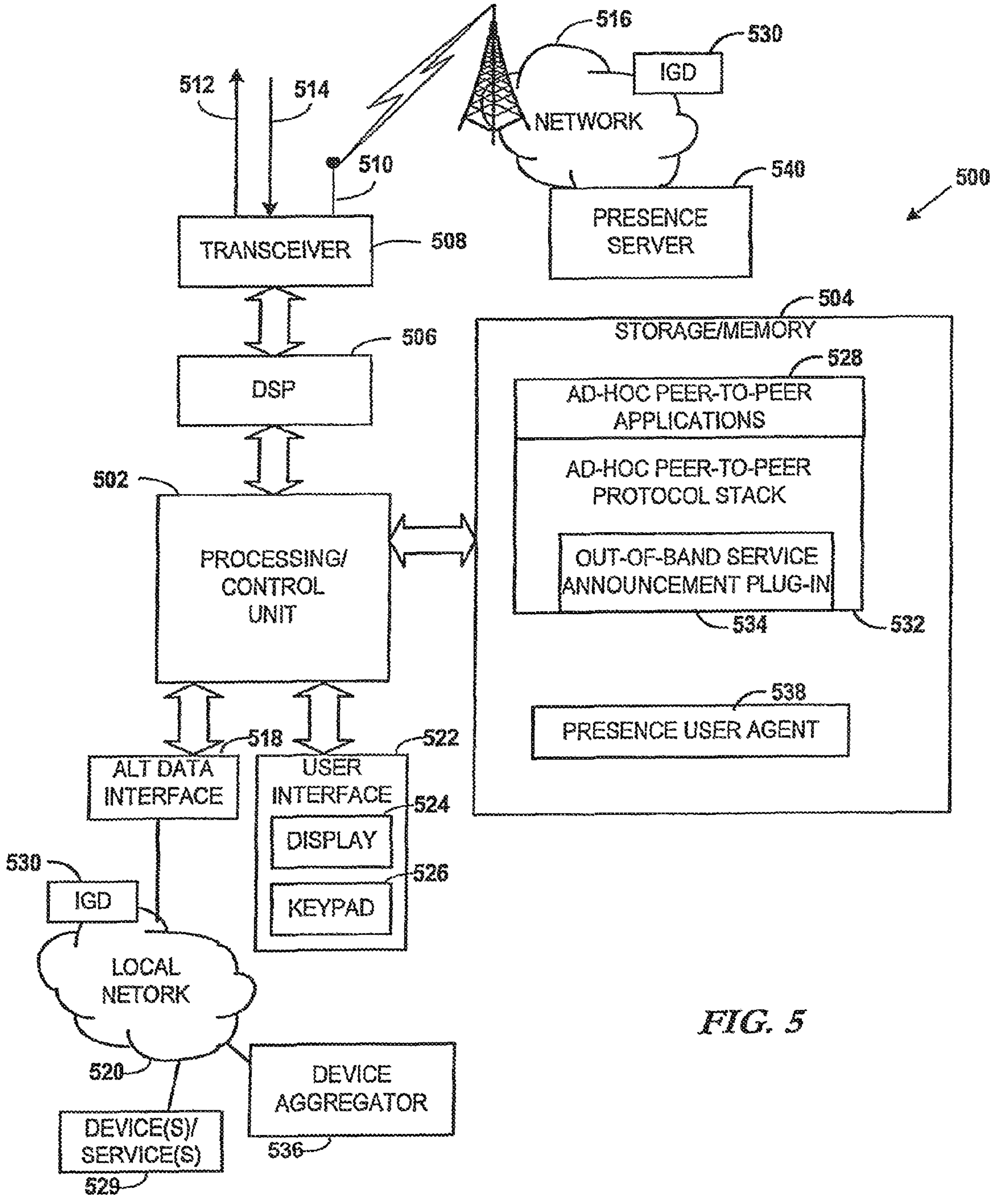
FIG. 5 is a block diagram of a mobile device according to an embodiment of the invention.

The mobile computing arrangement 500 of FIG. 5 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Figure 6:
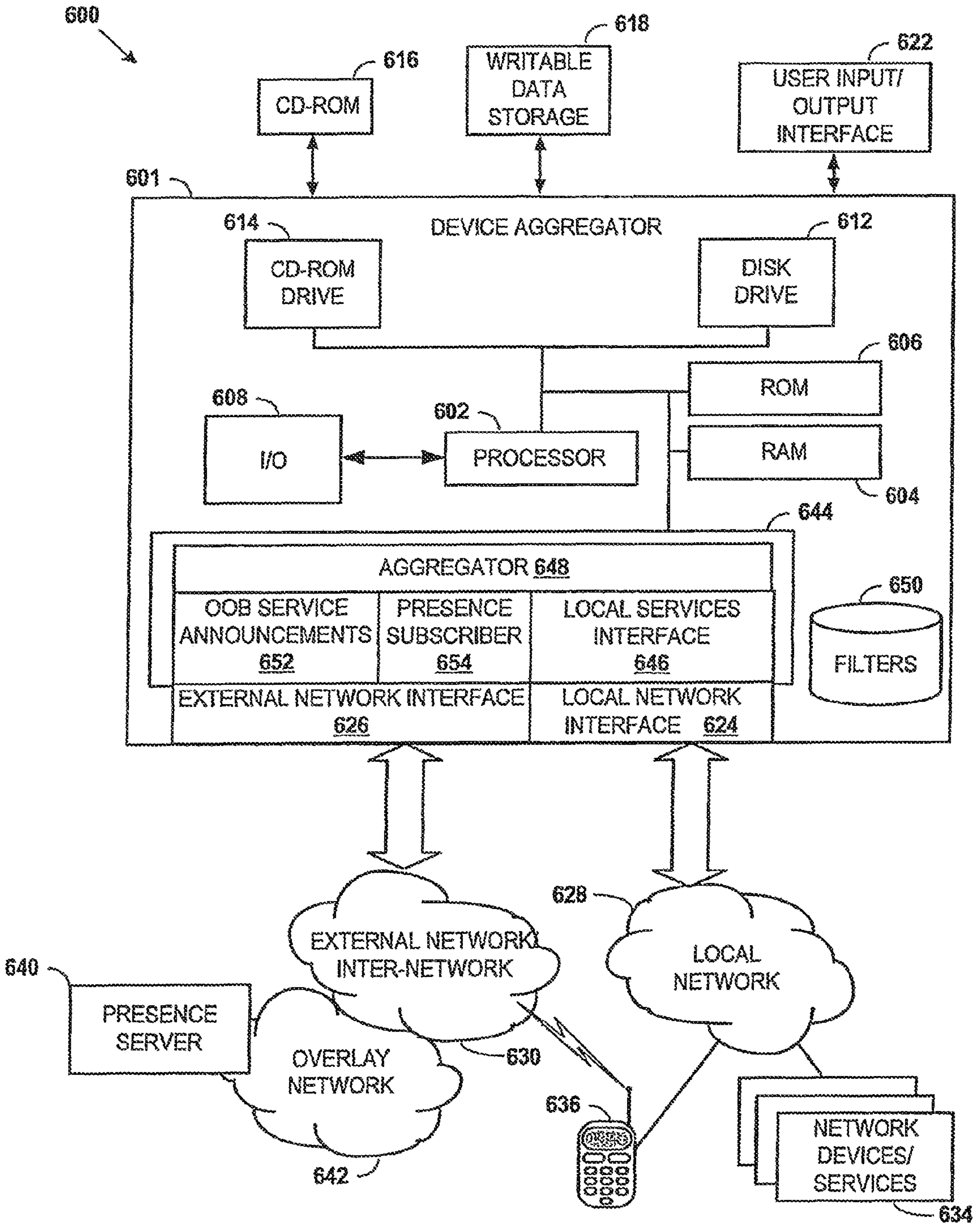
FIG. 6 is a block diagram of a device aggregator apparatus according to an embodiment of the invention.

Generally, a home computing/automation environment may use one or more devices that provide out-of-band communications to remote devices that enable the remote devices to discover ad-hoc, peer-to-peer services of the environment. Typically this remote service discovery is provided by a device that is always on, such as a router/gateway or server. In reference now to FIG. 6, a block diagram illustrates an example device aggregator apparatus 600 according to an embodiment of the invention. The device aggregator 600 includes a computing arrangement 601. The computing arrangement 601 may include custom or general-purpose electronic components. The computing arrangement 601 includes a central processor (CPU) 602 that may be coupled to random access memory (RAM) 604 and/or read-only memory (ROM) 606. The ROM 606 may include various types of storage media, such as programmable ROM (PROM), erasable PROM (EPROM), etc. The processor 602 may communicate with other internal and external components through input/output (I/O) circuitry 608. The processor 602 carries out a variety of functions as is known in the art, as dictated by software and/or firmware instructions.

The computing arrangement 601 may include one or more data storage devices, including disk drives 612, CD-ROM drives 614, and other hardware capable of reading and/or storing information such as DVD, etc. In one embodiment, software for carrying out the operations in accordance with the present invention may be stored and distributed on a CD-ROM 616, writable data storage media 618 or other form of media capable of portably storing information, including magnetic media, flash memory, etc. These storage media may be inserted into, and read by, devices such as the CD-ROM drive 614, the disk drive 612, I/O ports 608, etc. The software may also be transmitted to computing arrangement 601 via data signals, such as being downloaded electronically via a network, such as the Internet. The computing arrangement 601 may be coupled to a user input/output interface 622 for user interaction. The user input/output interface 622 may include apparatus such as a mouse, keyboard, microphone, touch pad, touch screen, voice-recognition system, monitor, LED display, LCD display, etc.

The computing arrangement 601 may be coupled to other computing devices via networks. In particular, the computing arrangement includes network interfaces 624, 626 capable of interacting with respective local "home" networks 628 and external "public" networks 630, 632. The local network 628 includes ad-hoc, peer-to-peer framework for connecting a number of network devices and services 634. The network devices and services 634 utilize automatic configuration and service discovery features of the local network to facilitate self-forming interactions between the various devices and services 634. The external network/inter-network 630 may include any combination of public and private networking entities suitable for providing access over a wide geographical area. The external network interface 626 may be coupled directly to the external networks 630, 642 as shown, or an intermediary device of the local network 628, such as a UPnP IGD, may facilitate access to the networks 630, 642.

The network interfaces 624, 626 may include a combination of hardware and software components, including media access circuitry, drivers, programs, and protocol modules. Ultimately, the computing arrangement 601 may be configured to gather discovery data using the native protocols of the local network 628 and send the discovery data to an authorized remote device 636 of the external networks 630 using out-of-band protocols. This out-of-band service discovery may be modified based on presence data associated with the device 636 and/or its user. This presence data may be obtained by a presence server 640, which may be accessible via the external networks 630 and/or a specialized overlay network 642.

The computing arrangement 601 includes processor executable instructions 644 for carrying out tasks of the computing arrangement 601. These instructions 644 may include a local services interface 646 capable of interacting with the local devices and services 634 using a service discovery protocol of the local network 628. The data associated with these service announcements are gathered and sent to an aggregator component 648. The aggregator component 648 may perform operations on the service announcement data, including correlation, removal of redundancy, reformatting, etc. The aggregator 648 may rely on stored filters 650 to determine how the service announcement data is to be processed. Alternatively, the aggregator 648 may process all the data equally, and rely on another component to filter the data appropriately.

The service announcement data processed by the aggregator 648 is used to generate service announcements to the remote device 636 using an out-of-band mechanism, such as Web syndication. An out-of-band service announcement module 652 receives the processed data from the aggregator 648 and sends it to the remote device 636. The out-of-band service data may already have been filtered/preselected by the aggregator 648 prior to sending to the module 652, and/or the module 652 may make its own selection or filtering decisions based on the filter data 650.

The filter data 650 is used to selectively provide appropriate service discovery data to the remote device 636 based on such factors as bandwidth, cost, security, convenience, user preference, and similar aspects related to data communication applications. These decisions may be affected by presence state of the user and/or the user's device. Therefore, the computing arrangement 601 includes a presence subscriber module 654 capable of determining user presence state, such as by accessing the presence server 640 via the overlay network 642. The presence subscriber 654 may communicate this presence information directly to other modules stored in instruction memory 644, and/or the presence data may be added to persistent data storage such as the filters database 650. Based on the presence data, the application of filters 650 to the transmission of out-of-band service discovery may be activated, deactivated, and/or modified. Further, the change in presence may be communicated to the devices/services 634 of the local network 628 using native ad-hoc, peer-to-peer mechanisms of the network 628. The local services module 646, or some other component, may facilitate dispersal of this presence data via the network 628.

Figure 7:
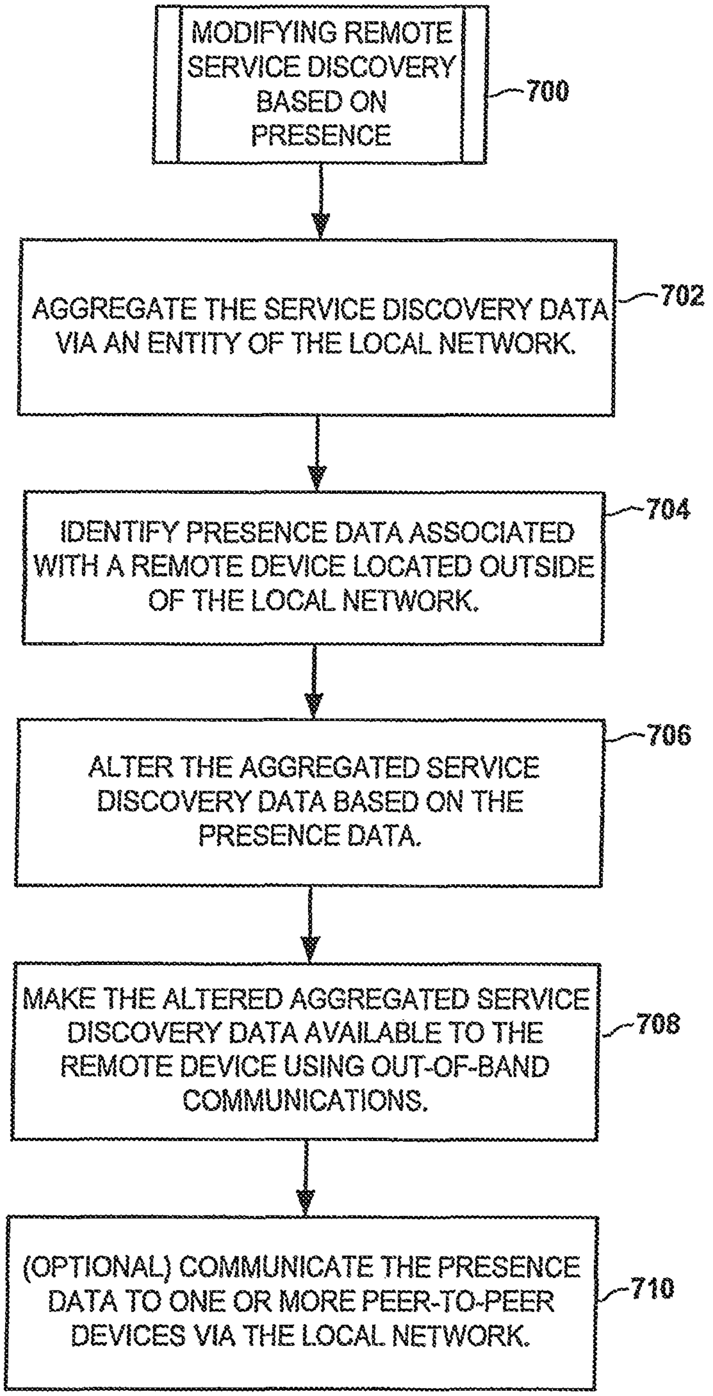
FIG. 7 is a flowchart illustrating modifying remote service discovery based on presence according to an embodiment of the invention.

In reference now to FIG. 7, a flowchart illustrates a procedure 700 for modifying remote service discovery based on presence according to an embodiment of the invention. Service discovery data of a local network is aggregated 702 via an entity of the local network. Presence data associated with a remote device located outside of the local network is identified 704. The aggregated service discovery data is altered 706 based on the presence data. The altered aggregated service discovery data is made available 708 to the remote device using out-of-band communications. Generally, the out-of-band communications are different from the service discovery protocols of the local network. The presence data may be optionally communicated 710 to one or more peer-to-peer devices via the local network.

In one variation of the procedure, at least one filter may be associated with each of a plurality of known presence states. Each filter describes services that may be remotely advertised to the remote device based on the presence state associated with the filter. In such a case, altering 706 the aggregated service discovery data based on the presence data involves identifying a presence state based on the presence data and selecting the filter associated with the identified presence state. The aggregated service discovery data is altered 706 with the selected filter In another variation of the procedure altering 706 the aggregated service discovery data may involve limiting the visibility of one or more services of the local network based on a presence state identified. The alteration 706 may include limiting the visibility of the one or more services based on lack of secure access to the one or more services or based on limited available network bandwidth of the remote device identified via the presence data. The alteration 706 may also include limiting the visibility of one or more services to allow the remote device to conserve power.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

The invention claimed is:

1. A method, comprising:

communicating presence information by presence update signaling messages from a device to a presence server that is capable of receiving presence updates relating to the device and that, in response thereto, determines a presence state at a given time and that is also capable of receiving service announcements from other devices in communication with one or more network entities using ad-hoc, peer-to-peer, service discovery protocols of a local network that are different from out-of-band communications over a wide area network, and receiving signaling messages using the out-of-band communications over the wide area network from the one or more network entities indicative of altered service discovery data available to the device from the other devices, wherein the altered service discovery data represents the service announcements received by the one or more network entities from the other devices altered by the one or more network entities based on the presence state determined by the one or more network entities.

2. The method of claim 1, wherein the service discovery protocols of the local network comprise Simple Service Discovery Protocol.

3. The method of claim 1, wherein the local network comprises a Universal Plug and Play network.

4. The method of claim 1, wherein the out-of-band communication comprises Web syndication communications.

5. The method of claim 1, wherein the at least one network entity is a presence server.

6. The method of claim 1, wherein the at least one other network entity is a device aggregator.

7. The method of claim 1, wherein the altered service discovery data is altered by limitation on visibility of one or more services of the local network based on the determined presence state communicated to the at least one other network entity.

8. The method of claim 1, wherein the altered service discovery data available to the device is altered based on limited available network bandwidth of the device.

9. The method of claim 1, wherein the altered service discovery data is altered based on monetary costs associated with network bandwidth used by the device.

10. The method of claim 1, wherein the altered service discovery data is altered to allow the device to conserve power.

11. A non-transitory computer readable medium having computer program code stored thereon that is executable by a processor for carrying out the method of claim 1 in said device.

12. Apparatus, comprising:

at least one processor; and at least one memory including computer program code, the at least one memory and the computer program code configured to, with the at least one processor, cause the apparatus at least to:

communicate presence information by presence update signaling messages sent from a device to a presence server that is capable of receiving presence updates relating to the device and that, in response thereto, determines a presence state at a given time and that is also capable of receiving service announcements from other devices in communication with one or more network entities using ad-hoc, peer-to-peer service discovery protocols of a local network that are different from the out-of-band communications over a wide area network, and receive signaling messages using the out-of-band communications over the wide area network from the one or more network entities indicative of altered service discovery data available to the device from the other devices, wherein the altered service discovery data represents the service announcements received by the one or more network entities altered by the one or more network entities based on the presence state determined by the one or more network entities.

13. The apparatus of claim 12, wherein the service discovery protocols of the local network comprise Simple Service Discovery Protocol.

14. The apparatus of claim 12, wherein the local network comprises a Universal Plug and Play network.

15. The apparatus of claim 12, wherein the out-of-band communication comprises Web syndication communications.

16. The apparatus of claim 12, wherein the at least one network entity is a presence server.

17. The apparatus of claim 12, wherein the at least one other network entity is a device aggregator.

18. The apparatus of claim 12, wherein the altered service discovery data is altered by limitation on visibility of one or more services of the local network based on the determined presence state communicated to the at least one other network entity.

19. The apparatus of claim 12, wherein the altered service discovery data available to the device is altered based on limited available network bandwidth of the device.

20. The apparatus of claim 12, wherein the altered service discovery data is altered based on monetary costs associated with network bandwidth used by the device.

21. The apparatus of claim 12, wherein the altered service discovery data is altered to allow the device to conserve power.

* * * * *